(12) United States Patent
Bito et al.

(10) Patent No.: US 6,270,923 B1
(45) Date of Patent: Aug. 7, 2001

(54) NON-AQUEOUS ELECTROLYTE SECONDARY BATTERY

(75) Inventors: Yasuhiko Bito, Osaka; Toshitada Sato, Kadoma; Hiromu Matsuda, Hyogo; Yoshinori Toyoguchi, Yao, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/281,899

(22) Filed: Mar. 31, 1999

(30) Foreign Application Priority Data

Apr. 3, 1998 (JP) .................................................. 10-091187

(51) Int. Cl.$^7$ .................................................. H01M 4/58
(52) U.S. Cl. .................................... 429/218.1; 429/231.1
(58) Field of Search ................................. 429/218.1, 225, 429/229, 231.6, 231.1

(56) References Cited

U.S. PATENT DOCUMENTS

| | | | |
|---|---|---|---|
| 3,959,012 | * 5/1976 | Liang et al. | 136/6 L |
| 4,707,422 | * 11/1987 | De Neufville et al. | 429/48 |
| 4,861,573 | 8/1989 | deNeufville et al. | |
| 5,260,148 | 11/1993 | Idota. | |
| 5,571,637 | 11/1996 | Idota. | |

FOREIGN PATENT DOCUMENTS

| | | | |
|---|---|---|---|
| 0651450 | 5/1995 | (EP). | |
| 2376077 | 7/1978 | (FR). | |
| 6-052848 | * 2/1994 | (JP) | H01M/4/02 |
| 07122274 | 5/1995 | (JP). | |
| 07235293 | 9/1995 | (JP). | |
| 07288123 | 10/1995 | (JP). | |
| 08264183 | 10/1996 | (JP). | |
| 10-092425 | * 4/1998 | (JP) | H01M/4/48 |
| 10223222 | 8/1998 | (JP). | |

OTHER PUBLICATIONS

Linden, "Handbook of Batteries" 2nd Edition, McGraw Hill Publishers, pp.36.2–36.9. (No month), 1995.*

* cited by examiner

*Primary Examiner*—Carol Chaney
(74) *Attorney, Agent, or Firm*—McDermott, Will & Emery

(57) ABSTRACT

The disclosure is a non-aqueous electrolyte secondary battery of high energy density and long life exhibiting an excellent charge and discharge cycle life. The battery comprises a rechargeable positive electrode, a rechargeable negative electrode, and a non-aqueous electrolyte, the negative electrode including a compound represented by the formula $Li_\kappa MX_\alpha$, where X represents at least one selected from the group consisting of fluorine, chlorine, bromine and iodine and M represents at least one selected from the group consisting of Sn, Si, Ge, Pb, Bi, P, B, Ga, In, Al, As, Sb, Zn, Ir, Mg, Ca, Sr, and Ba and where $0 \leq \kappa < 10$ and $2 < \alpha < 12$.

9 Claims, 2 Drawing Sheets

NON-AQUEOUS ELECTROLYTE SECONDARY BATTERY

BACKGROUND OF THE INVENTION

The present invention relates to improvements of the negative electrode for constituting non-aqueous electrolyte secondary battery, more particularly to a non-aqueous electrolyte secondary battery of high energy density free from adverse internal shortcircuit as a growth factor of lithium dendrites.

There have been various vigorous studies about the non-aqueous electrolyte secondary battery including a negative electrode of lithium or lithium compound because it affords a high discharge voltage and therefore is expected to offer a high energy density. The known conventionally proposed positive electrode active materials for use in non-aqueous electrolyte secondary battery include oxides or chalcogenides of transition metal such as $LiMn_2O_4$, $LiCoO_2$, $LiNiO_2$, $V_2O_5$, $Cr_2O_5$, $MnO_2$, $TiS_2$, $MoS_2$ and the like.

The above-exemplified compounds have a layered or tunneled crystal structure permitting intercalation or deintercalation of lithium ions.

Concerning the negative electrode active material for use in non-aqueous electrolyte secondary battery, on the other hand, the use of metallic lithium has been investigated extensively. However, metallic lithium as the negative electrode active material of a battery has an inevitable issue of deposition of lithium dendrites on the surface of metallic lithium upon charge, which impairs charge and discharge efficiency or induces internal shortcircuit due to contact of the lithium dendrite with the positive electrode.

As the measure for solving such problem, there have been studies on the availability to the negative electrode of a certain lithium alloy such as lithium-aluminum alloy which is capable of absorbing therein and desorbing therefrom lithium while best reducing growth of lithium dendrites on the surface of the alloy. However, the use of such lithium alloy as the negative electrode active material has a disadvantage that the electrode material is liable to be pulverized by repetitive deep charge and discharge operations, which in turn reduces the discharge capacity of the resultant battery with the progress of charge and discharge cycles.

To solve this problem, there are proposed methods for suppressing pulverization of the electrode by using, as the electrode, a lithium alloy like lithium-aluminum alloy as mentioned above further containing other elements. These proposals can be found in Japanese Laid-Open Patent Publications No. Sho 62-119856 and Hei 4-109562. However, these attempts have failed to achieve a lithium ion secondary battery including a lithium alloy negative electrode fulfilling the required characteristics or performance in practical use.

Instead, the presently realized lithium ion secondary battery includes a carbon material as the negative electrode active material in place of the above-mentioned alloy system.

Carbon material affords a smaller capacity than the alloy negative electrode active material but can reversibly absorb therein and desorb therefrom lithium, thus manifesting an excellent charge and discharge cycle life. Another advantage of carbon material is unlikeliness to develop deposition of lithium dendrites on the surface of the negative electrode active material upon charge, thereby facilitating security of the safety of the resultant battery with relative ease.

Under the circumstance, there is a proposal of a lithium ion secondary battery including an oxide negative electrode in order to realize a battery having a further increased capacity. The proposed oxides as the negative electrodes affording a higher capacity than the conventional compound such as $WO_2$ may be exemplified as $SnO$ and $SnO_2$ of crystalline structure, which are disclosed in Japanese Laid-Open Patent Publications No. Hei 7-122274 and Hei 7-235293. The use of an amorphous oxide such as $SnSiO_3$ or $SnSi_{1-x}P_xO_3$ for the negative electrode has also been proposed in Japanese Laid-Open Patent Publication No. Hei 7-288123 in order to improve the cycle life characteristics of a battery.

The present inventors suggest that metal salts or semi-metal salts comprising at least one selected from the group consisting of nitrate, sulfate, hydrogen sulfate, thiocyanate, cyanide, cyanate, carbonate, hydrogen carbonate, hydrogen borate, hydrogen phosphate, selenate, hydrogen selenate, tellurate, hydrogen tellurate, tungstate, molybdate, titanate, chromate, zirconate, niobate, tantalate, manganate, and vanadate can serve as the negative electrode active materials producing a high capacity non-aqueous electrolyte secondary battery with an excellent cycle life characteristic.

The present inventors also suggest that compounds of crystalline structure containing at least two or more selected from the group consisting of Si, Ge, Sn, Pb, Bi, P, B, Ga, In, Al, As, Sb, Zn, Ir, Mg, Ca, Sr, and Ba together with at least one selected from the group consisting of oxygen, sulfur, selenium, and tellurium can constitute negative electrode materials giving a non-aqueous electrolyte secondary battery having a high capacity and an excellent cycle life characteristic.

The present inventors experimentally confirmed a drastic improvement of the cycle life characteristic in the non-aqueous electrolyte secondary batteries including the above-exemplified negative electrode active materials compared to that of the non-aqueous electrolyte secondary batteries having conventionally proposed materials.

However, in correspondence with the current active movement toward realization of a multi-functional portable equipment and a large battery for use in an electric vehicle, for example, there is an increasing demand for a battery of an even longer life as a driving power source. It is true, however, that the above-mentioned negative electrode materials have not yet fulfilled the demand for a battery having a sufficiently long cycle life.

In view of such current demand, the object of the present invention is, therefore, to provide a high capacity non-aqueous electrolyte secondary battery which is free of growth of adverse lithium dendrites during charge and discharge and has a drastically elongated cycle life.

BRIEF SUMMARY OF THE INVENTION

The present invention provides a non-aqueous electrolyte secondary battery comprising a rechargeable positive electrode, a rechargeable negative electrode, and a non-aqueous electrolyte, wherein the negative electrode includes a compound represented by the general formula $Li_\kappa MX_\alpha$, where X represents at least one selected from the group consisting of fluorine, chlorine, bromine and iodine and M represents at least one selected from the group consisting of Sn, Si, Ge, Pb, Bi, P, B, Ga, In, Al, As, Sb, Zn, Ir, Mg, Ca, Sr, and Ba and where $0 \leq \kappa < 10$ and $2 < \alpha < 12$.

Here, it is preferred that the value of $\alpha$ in the formula is in a range of $4 < \alpha < 8$.

It is also preferred that the compound represented by the general formula $Li_\kappa MX_\alpha$ has an amorphous structure.

It is also desirable that primary particles of the compound represented by the general formula $Li_\kappa MX_\alpha$ has a mean size of 0.01 μm to 1 μm.

In a preferred mode of the present invention, the negative electrode includes a compound represented by the general formula $Li_\kappa SnX_\alpha$, where X represents at least one selected from the group consisting of chlorine, fluorine, bromine and iodine and where $0 \leq \kappa < 10$ and $2 < \alpha < 12$.

Here, X is preferably at least bromine or iodine.

The present invention also relates to a non-aqueous electrolyte secondary battery comprising a rechargeable positive electrode, a rechargeable negative electrode, and a non-aqueous electrolyte, wherein the negative electrode includes a compound represented by the general formula $Li_\kappa MX_\alpha$, where X represents at least one selected from the group consisting of fluorine, chlorine, bromine and iodine and M represents at least one selected from the group consisting of Si, Ge, Pb, Bi, P, B, Ga, In, Al, As, Sb, Zn, Ir, Mg, Ca, Sr, and Ba and where $0 \leq \kappa < 10$ and $1 < \alpha \leq 2$.

Therefore, the present invention also provides a non-aqueous electrolyte secondary battery comprising a rechargeable positive electrode, a rechargeable negative electrode, and a non-aqueous electrolyte, wherein the negative electrode includes a compound represented by the general formula $Li_\kappa SnX_\alpha$, where X represents at least one selected from the group consisting of bromine and iodine and where $0 \leq \kappa < 10$ and $1 < \alpha \leq 2$.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
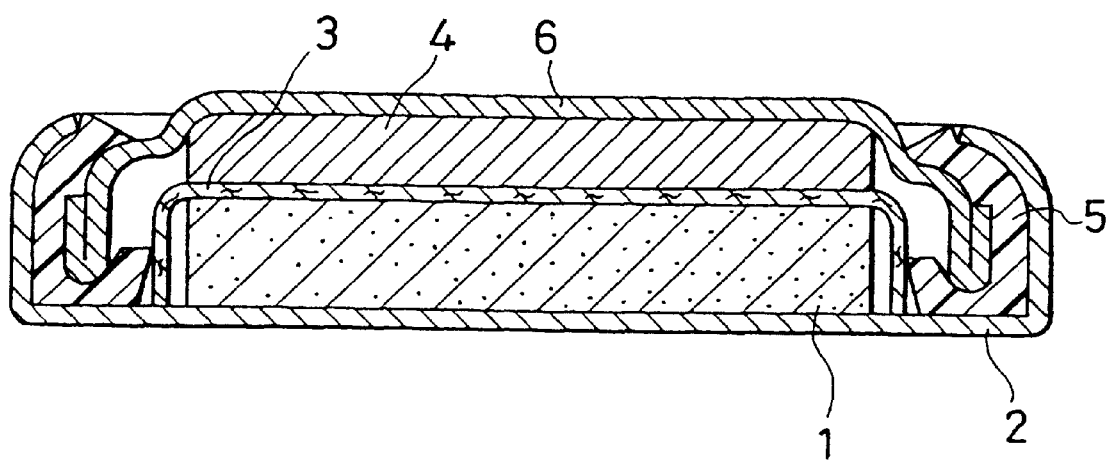
FIG. 1 is a diagrammatic sketch of the cross-section of a test cell for evaluating characteristics of the negative electrode including an active material in accordance with the present invention.

After vigorous search for an effective negative electrode active material for use in non-aqueous electrolyte secondary battery, the present inventors have found that the conventional metallic oxides, metal salts and carbon materials demonstrate structural fragility in response to expansion and constriction caused by intercalation and deintercalation of lithium in the course of charge and discharge for battery, but the above-specified halogenides stand stable against charge and discharge.

It is unknown at present where lithium can be intercalated in the crystal structure of those negative active material halogenides in accordance with the present invention. The suggested mechanism of the stability of the halogenides against expansion and constriction upon excess intercalation and deintercalation of lithium in response to charge and discharge for battery is as follows:

Taking, as a representative of halogenides of the present invention, the compound represented by the formula $SnX_\alpha$ where X is at least one of bromine and iodine and where $1 < \alpha < 12$, the mechanism will be described.

The compound was found to vary its cycle life characteristic by the value of $\alpha$. In other words, as shown in Table 5, this compound offers a better cycle life characteristic in the range of $2 < \alpha < 10$ and a particularly exceptional cycle life characteristic in the range of $3 < \alpha < 8$.

The estimated reason for the variation in cycle life is as follows:

In $SnF_\alpha$, for example, in response to initial charge (Li intercalation), a reduction of 4-valent ionic Sn to 0-valent metallic Sn will occur by the following reaction:

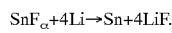

$$SnF_\alpha + 4Li \rightarrow Sn + 4LiF.$$

This reaction produces a matrix LiF at the same time. At that time, fine metallic or amorphous Sn is supposed to be forced to exist inside or with the LiF matrix.

The subsequent charge causes the following reaction:

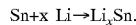

$$Sn + x\, Li \rightarrow Li_x Sn.$$

Through this reaction, the alloy of Li and Sn is considered to be produced.

Conversely, discharge (Li deintercalation) causes a reversed reaction.

Production of an alloy of 0-valent Sn with Li in the negative electrode has conventionally led to an extraordinary impaired cycle life of the battery due to adverse effects of pulverization of alloy powder and accumulation of electrochemically inactive alloy phases by the change in volume in the course of alloying between Sn and Li upon charge and discharge. To the contrary, in accordance with the present invention, adverse effects of pulverization and accumulation of inactive alloy phases can be precluded by the presence of LiF as a matrix during alloying of Li with metallic Sn which is present inside or together with the LiF matrix during charge and discharge, thereby realizing a battery with an exceptional cycle life.

The state and amount of such matrix may be related to the dependency of the cycle life characteristic of the compound $SnF_\alpha$ on the value of $\alpha$. This means that the prerequisite for improving the cycle life characteristic of a battery is the presence of matrix of a certain ratio or more to metallic Sn. Another prerequisite is homogeneous distribution of the matrix. In order to realize such an environment, it is important that the value of a should be in a range of $2 < \alpha < 10$. In a poorly anionic condition such as $\alpha \leq 2$ which eventually leads to a deficiency of the matrix LiF, the matrix may become too insufficient to enable reversible charge and discharge, failing to best preventing the change in volume upon intercalation and deintercalation of lithium by charge and discharge. On the other hand, when $a > 10$, the resultant alloy may have sufficient matrices but unfortunately have poor conductivity. This inhibits the reaction between metallic Sn and Li upon charge and discharge, resulting in a poor cycle life of the battery. By the same mechanism, when the value of $\alpha$ is in a range of $3 < \alpha < 8$, the resultant compound is considered to offer an exceptional cycle life characteristic and facilitates smooth charge and discharge cycles.

In the following, the negative electrode active materials in accordance with the present invention will be described more specifically referring to concrete examples. However, it should ne noticed that the present invention is not limited to the compositions specified in those examples and any compounds of the elements disclosed in the present invention can produce an identical effect.

EXAMPLE 1

In this example, various fluorides as listed in Table 1 were evaluated. FIG. 1 illustrates the structure of a test cell used for evaluating the electrode characteristics of those various fluorides as negative electrode active materials.

An active material mixture was prepared by mixing a fluoride powder (6 g) with a graphite powder as a conductive material (3 g) and a polyethylene powder as a binder (1 g). An aliquot of the mixture (0.1 g) was applied onto a disc of 17.5 mm diameter and molded by pressure to form an electrode 1. The electrode thus produced was positioned in the center of a case 2 and a separator 3 made of a porous polypropylene film was placed thereon. Then, a non-aqueous electrolyte of a mixed solution of ethylene carbonate with dimethoxyethane (1:1 in volumetric ratio) dissolving 1 mole/l lithium perchlorate was poured over the separator 3. Subsequently, the case 2 was sealed with a sealing plate 6 having a disc of metallic lithium sheet 4 of 17.5 mm diameter bonded to the internal wall and a polypropylene gasket 6 mounted on the periphery and used as a test cell.

Each of the test cells thus produced was tested by cathodic polarization (corresponding to charge when the electrode 1 composed of the active material is taken as the negative electrode) at a constant current of 2 mA until the electrode 1 showed a potential of 0 V vs. a lithium counter electrode 4, followed by anodic polarization (similarly corresponding to discharge) until the electrode 1 showed a potential of 1.5 V. The test cells received consecutive 100 cycles of cathodic and anodic polarization and evaluated for their electrode characteristics. The active material used for comparison was $SnO_2$.

Table 1 lists the discharge capacity at the second cycle per g of active material and discharge capacity retention ratio at the 100th cycle in each cell. The capacity at the second cycle was taken as the standard in evaluating the discharge capacity retention ratio.

Upon completion of cathodic polarization at the 100th cycle, each test cell was disassembled and was found to have no deposits of metallic lithium.

TABLE 1

| Active materials | Discharge capacity (mAh/g) | Capacity retention ratio (%) |
| --- | --- | --- |
| $SiF_4$ | 450 | 90 |
| $Si_2F_6$ | 450 | 90 |
| $GeF_2$ | 460 | 90 |
| $GeF_4$ | 460 | 90 |
| $PbF_2$ | 500 | 90 |
| $PbF_4$ | 500 | 90 |
| $BiF_3$ | 500 | 95 |
| $BiF_5$ | 500 | 95 |
| $PF_3$ | 400 | 90 |
| $PF_5$ | 400 | 90 |
| $BF_3$ | 450 | 90 |
| $GaF_3$ | 450 | 90 |
| $InF_3$ | 500 | 90 |
| $AlF_3$ | 460 | 90 |
| $AsF_3$ | 460 | 95 |
| $AsF_5$ | 460 | 95 |
| $SbF_3$ | 450 | 90 |
| $SbF_5$ | 450 | 90 |
| $ZnF_2$ | 450 | 90 |
| $IrF_3$ | 450 | 95 |
| $IrF_5$ | 450 | 95 |
| $IrF_6$ | 450 | 95 |
| $MgF_2$ | 450 | 90 |
| $CaF_2$ | 450 | 95 |

TABLE 1-continued

| Active materials | Discharge capacity (mAh/g) | Capacity retention ratio (%) |
| --- | --- | --- |
| $SrF_2$ | 450 | 90 |
| $BaF_2$ | 450 | 90 |
| $SnO_2$ | 350 | 20 |

As shown in Table 1, all the active materials evaluated in Example 1 have a higher capacity than the comparative example and all the non-aqueous electrolyte secondary batteries including fluoride active materials in accordance with the present invention have an exceptionally high discharge capacity retention ratio.

EXAMPLE 2

In this example, various chlorides as listed in Table 2 were evaluated. Except for the use of the various chloride active materials, the electrode structure, production method of the test cell, charge and discharge conditions, and evaluation method were the same as in Example 1.

Table 2 lists the discharge capacity at the second cycle per g of active material and discharge capacity retention ratio at the 100th cycle in each cell.

Upon completion of cathodic polarization at the 100th cycle, each test cell was disassembled and was found to have no deposits of metallic lithium.

TABLE 2

| Active materials | Discharge capacity (mAh/g) | Capacity retention ratio (%) |
| --- | --- | --- |
| $SiCl_4$ | 450 | 90 |
| $SiCl_6$ | 450 | 90 |
| $GeCl_2$ | 450 | 90 |
| $GeCl_4$ | 450 | 90 |
| $PbCl_2$ | 450 | 90 |
| $PbCl_4$ | 450 | 90 |
| $BiCl_3$ | 460 | 95 |
| $PCl_3$ | 500 | 90 |
| $PCl_5$ | 500 | 90 |
| $BCl_3$ | 500 | 90 |
| $GaCl_3$ | 400 | 90 |
| $InCl$ | 450 | 90 |
| $InCl_3$ | 450 | 90 |
| $AlCl_3$ | 450 | 90 |
| $AsCl_3$ | 500 | 95 |
| $SbCl_3$ | 460 | 90 |
| $SbCl_5$ | 460 | 90 |
| $ZnCl_2$ | 460 | 90 |
| $IrCl_2$ | 450 | 95 |
| $IrCl_3$ | 450 | 95 |
| $IrCl_4$ | 450 | 95 |
| $MgCl_2$ | 450 | 90 |
| $CaCl_2$ | 450 | 95 |
| $SrCl_2$ | 450 | 90 |
| $BaCl_2$ | 450 | 90 |
| $SnO_2$ | 350 | 20 |

As shown in Table 2, all the active materials evaluated in Example 2 have a higher capacity than the comparative example and all the non-aqueous electrolyte secondary batteries including chloride active materials in accordance with the present invention have an exceptionally high discharge capacity retention ratio.

EXAMPLE 3

In this example, various bromides as listed in Table 3 were evaluated in the same manner as in Example 1.

Upon completion of cathodic polarization at the 100th cycle, each test cell was disassembled and was found to have no deposits of metallic lithium.

Table 3 lists the discharge capacity at the second cycle per g of active material and discharge capacity retention ratio at the 100th cycle in each cell.

TABLE 3

| Bromides | Discharge capacity (mAh/g) | Capacity retention ratio (%) |
|---|---|---|
| $SiBr_4$ | 450 | 90 |
| $SiBr_6$ | 450 | 90 |
| $GeBr_3$ | 460 | 90 |
| $GeBr_4$ | 460 | 90 |
| $PbBr_2$ | 500 | 90 |
| $BiBr_3$ | 500 | 95 |
| $PBr_3$ | 400 | 90 |
| $PBr_5$ | 400 | 90 |
| $BBr_3$ | 450 | 90 |
| $GaBr_3$ | 450 | 90 |
| $InBr$ | 500 | 90 |
| $InBr_3$ | 500 | 90 |
| $AlBr_3$ | 460 | 90 |
| $AsBr_3$ | 460 | 95 |
| $SbBr_3$ | 450 | 90 |
| $ZnBr_2$ | 450 | 90 |
| $IrBr_3$ | 450 | 95 |
| $IrBr_4$ | 450 | 95 |
| $MgBr_2$ | 450 | 90 |
| $CaBr_2$ | 450 | 95 |
| $SrBr_2$ | 450 | 90 |
| $BaBr_2$ | 450 | 90 |
| $SnO_2$ | 350 | 20 |

As shown in Table 3, all the active materials evaluated in Example 3 have a higher capacity than the comparative example and all the non-aqueous electrolyte secondary batteries including bromide active materials in accordance with the present invention have an exceptionally high discharge capacity retention ratio.

EXAMPLE 4

In this example, various iodides as listed in Table 4 were evaluated in the same manner as in Example 1.

Upon completion of cathodic polarization at the 100th cycle, each test cell was disassembled and was found to have no deposits of metallic lithium.

Table 4 lists the discharge capacity at the second cycle per g of active material and discharge capacity retention ratio at the 100th cycle in each cell.

TABLE 4

| Iodides | Discharge capacity (mAh/g) | Capacity retention ratio (%) |
|---|---|---|
| $SiI_4$ | 450 | 90 |
| $SiI_6$ | 450 | 90 |
| $GeI_2$ | 450 | 90 |
| $GeI_4$ | 450 | 90 |
| $PbI_2$ | 450 | 90 |
| $BiI_3$ | 460 | 95 |
| $PI_3$ | 500 | 90 |
| $P_2I_4$ | 500 | 90 |
| $BI_3$ | 500 | 90 |
| $GaI_3$ | 400 | 90 |
| $InI$ | 450 | 90 |
| $InI_3$ | 450 | 90 |
| $AlI_3$ | 450 | 90 |

TABLE 4-continued

| Iodides | Discharge capacity (mAh/g) | Capacity retention ratio (%) |
|---|---|---|
| $AsI_3$ | 500 | 95 |
| $AsI_5$ | 500 | 95 |
| $SbI_3$ | 460 | 90 |
| $ZnI_2$ | 460 | 90 |
| $IrI_3$ | 450 | 95 |
| $IrI_4$ | 450 | 95 |
| $MgI_2$ | 450 | 90 |
| $CaI_2$ | 450 | 95 |
| $SrI_2$ | 450 | 90 |
| $BaI_2$ | 450 | 90 |
| $SnO_2$ | 350 | 20 |

As shown in Table 4, all the active materials evaluated in Example 4 have a higher capacity than the comparative example and all the non-aqueous electrolyte secondary batteries including iodide active materials in accordance with the present invention have an exceptionally high discharge capacity retention ratio.

EXAMPLE 5

In this example, various Sn halogenides as listed in Table 5 were evaluated in the same manner as in Example 1. Upon completion of cathodic polarization at the 100th cycle, each test cell was disassembled and was found to have no deposits of metallic lithium.

Table 5 lists the discharge capacity at the second cycle per g of active material and discharge capacity retention ratio at the 100th cycle in each cell.

TABLE 5

| Tin halides | Discharge capacity (mAh/g) | Capacity retention ratio (%) |
|---|---|---|
| $SnF_{1.5}$ | 450 | 90 |
| $SnF_2$ | 450 | 90 |
| $SnF_3$ | 550 | 100 |
| $SnF_4$ | 550 | 100 |
| $SnF_6$ | 550 | 100 |
| $SnF_8$ | 500 | 100 |
| $SnF_{10}$ | 450 | 100 |
| $SnF_{12}$ | 350 | 100 |
| $SnBr_{1.5}$ | 450 | 90 |
| $SnBr_2$ | 450 | 90 |
| $SnBr_4$ | 550 | 100 |
| $SnBr_6$ | 450 | 100 |
| $SnBr_8$ | 450 | 100 |
| $SnBr_{10}$ | 450 | 100 |
| $SnBr_{12}$ | 350 | 100 |
| $SnI_{1.5}$ | 460 | 90 |
| $SnI_2$ | 460 | 100 |
| $SnI_4$ | 550 | 100 |
| $SnI_6$ | 500 | 100 |
| $SnI_8$ | 500 | 100 |
| $SnI_{10}$ | 500 | 100 |
| $SnI_{12}$ | 350 | 100 |
| $SnO_2$ | 350 | 20 |

As shown in Table 5, all the active materials evaluated in Example 5 have a higher capacity than the comparative example and all the non-aqueous electrolyte secondary batteries including halogenide active materials in accordance with the present invention have an exceptionally high discharge capacity retention ratio.

The above experiment showed that the cycle life characteristics offered by the compounds represented by the general formula $SnX_\alpha$, where X represents at least one selected from the group of bromine and iodine and $1<\alpha<12$, are dependent on the value of $\alpha$. As shown in Table 5, those compounds can offer better cycle life characteristics when $2<\alpha<10$ and can produce particularly better ones when $3<\alpha<8$. Every compound which has an α value out of the above ranges is considered to meet difficulty in best coping with various changes (pulverization, volume change, etc.) during charge and discharge, and therefore the battery including such compound may suffer from a large reduction in capacity with the progress of charge and discharge cycles.

EXAMPLE 6

Figure 2:
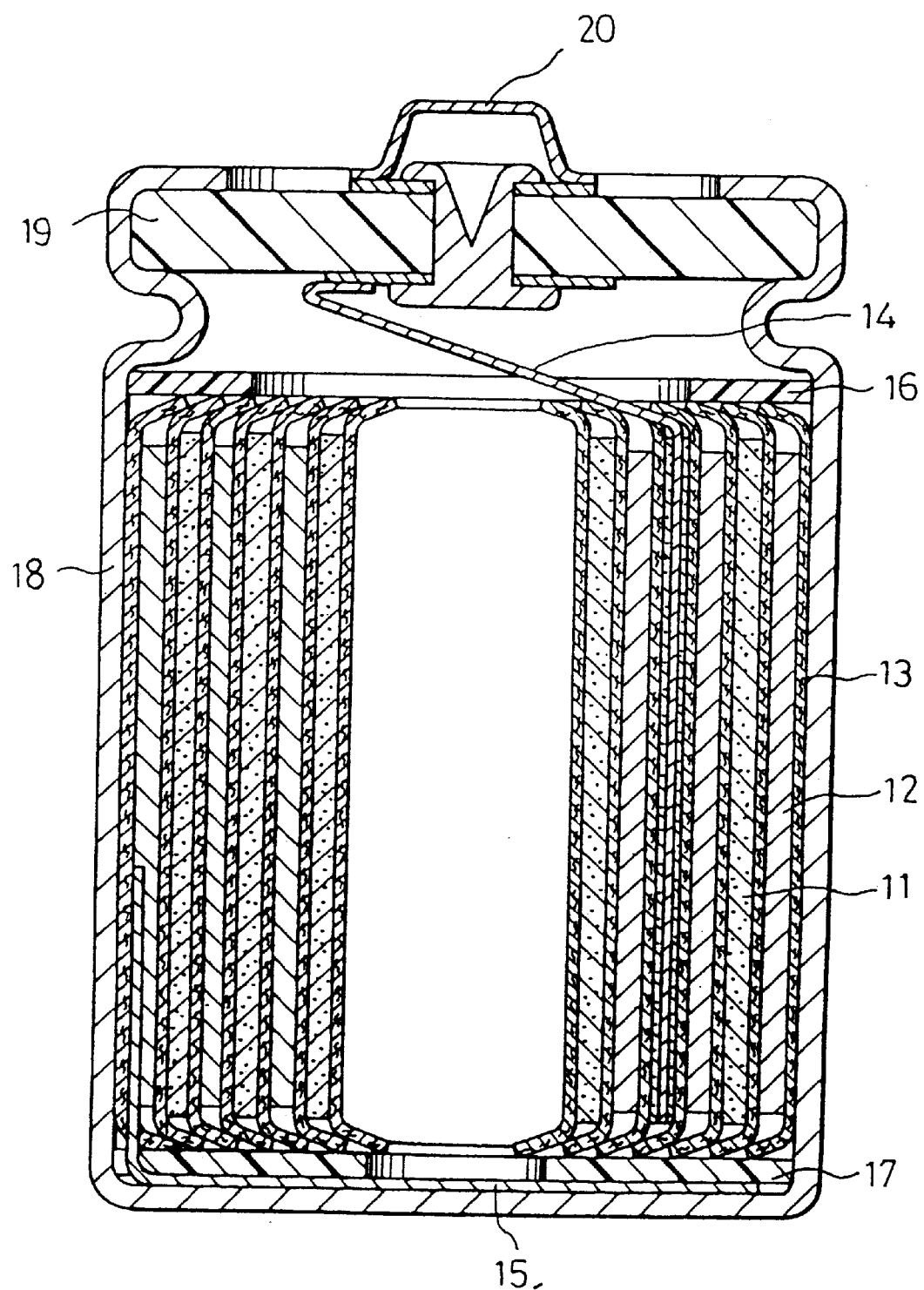
FIG. 2 is a longitudinal cross-sectional sketch illustrating a cylindrical battery used in one example for embodying the present invention.

In this example, various compounds as listed in Table 6 were evaluated. FIG. 2 illustrates the structure of a test cell used for evaluating their characteristics.

A battery was produced as follows:

A positive electrode active material $LiMn_{1.8}Co_{0.2}O_4$ was synthesized by heating a mixture of $Li_2CO_3$, $Mn_3O_4$ and $CoCO_3$ in a predetermined molar ratio at 900° C. The resultant material was classified into powders of 100 mesh or less, which were used as the positive electrode active material in this example. To the active material powder (100 g), a carbon powder as a conductive material (10 g) and an aqueous dispersion of polytetrafluoroethylene as a binder (8 g as solids) were added together with pure water to make a paste. The paste was applied onto a titanium core, dried and rolled, which gave a positive electrode plate.

Then, a mixture of either negative electrode active material listed in Table 6, a graphite powder as a conductive material and polytetrafluoroethylene as a binder at 60:30:10 in weight ratio was made into a paste using a petroleum solvent. The paste was applied onto a copper core, dried at 100° C. and rolled, which gave a negative electrode plate. The separator was a porous polypropylene film.

A positive electrode plate 11 having a spot-welded positive lead 14 made of the same material as used in the core and a negative electrode plate 12 having a spot-welded negative lead 15 made of the same material as used in the core were combined with a band-like porous polypropylene separator 13 having a wider size than the two electrode plates being interposed therebetween. The combination was spirally wound up to form an electrode group. Then, the electrode group was deposited with propylene insulating plates 16, 17 at the top and the bottom and placed inside a case 18. After forming a step at an upper portion in the case 18, a non-aqueous electrolyte of an equivolumetric mixed solution of ethylene carbonate and dimethoxyethane dissolving 1 mole/l lithium perchlorate was injected into the case 18. The case was then sealed with a sealing plate 19 connected with a positive terminal 20, which gave a battery for use in this example.

Each of the batteries thus produced was tested by repeated charge and discharge at 30° C. at a current of 1 mA/cm² within a voltage range of 4.3 V to 2.6 V. Table 6 lists the discharge capacity retention ratio at the 100th cycle to the discharge capacity at the second cycle in each battery. As in the above examples, $SnO_2$ was used as the negative electrode active material for comparison.

TABLE 6

| Active materials | Discharge capacity (mAh/g) | Capacity retention ratio (%) |
| --- | --- | --- |
| $SiF_4$ | 600 | 90 |
| $Si_2F_6$ | 600 | 95 |
| $GeF_2$ | 650 | 90 |
| $GeF_4$ | 600 | 92 |
| $PbF_2$ | 600 | 90 |
| $PbF_4$ | 600 | 93 |
| $BiF_3$ | 600 | 95 |
| $BiF_5$ | 600 | 95 |
| $PF_3$ | 600 | 90 |
| $PF_5$ | 600 | 95 |
| $BF_3$ | 650 | 95 |
| $GaF_3$ | 650 | 90 |
| $InF_3$ | 620 | 90 |
| $AlF_3$ | 600 | 90 |
| $AsF_3$ | 630 | 95 |
| $AsF_5$ | 620 | 95 |
| $SbF_3$ | 600 | 90 |
| $SbF_5$ | 620 | 95 |
| $ZnF_2$ | 630 | 90 |
| $IrF_3$ | 620 | 95 |
| $IrF_5$ | 610 | 95 |
| $IrF_6$ | 600 | 95 |
| $MgF_2$ | 650 | 90 |
| $CaF_2$ | 620 | 95 |
| $SrF_2$ | 600 | 90 |
| $BaF_2$ | 620 | 90 |
| $SnO_2$ | 300 | 20 |

As evident from Table 6, all the batteries including various negative electrode active material compounds in accordance with Example 6 are greatly improved in cycle life characteristics compared to the battery of comparative example.

EXAMPLE 7

Various compounds as listed in Table 7 were evaluated for their characteristics in the same manner as in Example 6.

TABLE 7

| Tin halides | Discharge capacity (mAh/g) | Capacity retention ratio (%) |
| --- | --- | --- |
| $SnF_{1.5}$ | 600 | 90 |
| $SnF_2$ | 600 | 90 |
| $SnF_3$ | 650 | 100 |
| $SnF_4$ | 600 | 100 |
| $SnF_6$ | 600 | 100 |
| $SnF_8$ | 600 | 100 |
| $SnF_{10}$ | 600 | 100 |
| $SnF_{12}$ | 600 | 100 |
| $SnBr_{1.5}$ | 600 | 90 |
| $SnBr_2$ | 600 | 90 |
| $SnBr_4$ | 650 | 100 |
| $SnBr_6$ | 650 | 100 |
| $SnBr_8$ | 620 | 100 |
| $SnBr_{10}$ | 600 | 100 |
| $SnBr_{12}$ | 630 | 100 |
| $SnI_{1.5}$ | 620 | 90 |
| $SnI_2$ | 600 | 100 |
| $SnI_4$ | 620 | 100 |
| $SnI_6$ | 630 | 100 |
| $SnI_8$ | 620 | 100 |
| $SnI_{10}$ | 610 | 100 |
| $SnI_{12}$ | 600 | 100 |
| $SnO_2$ | 250 | 20 |

As is seen from Table 7, all the batteries including various compounds in accordance with Example 7 as the negative electrode active materials are greatly improved in cycle life characteristics compared to the battery of comparative example.

EXAMPLE 8

In this example, batteries including various conductive materials in the active material mixture were evaluated. As listed in Table 8, the conductive materials were natural graphite, artificial graphite, poorly crystalline carbon, carbon black, acetylene black, ketchen black, carbon fiber, copper powder, nickel powder, aluminum powder, silver powder, metallic nickel fiber and polyphenylene derivatives.

As shown in Table 8, the negative electrode active materials were $SnF_4$, $SnBr_4$ and $SnI_4$. The negative electrode mixture was prepared by mixing one of the active materials (6 g), one of the conductive materials (3 g) and a polyethylene powder as a binder (1 g). The production method of the test cell and the testing method were the same as in Example 1.

Similarly, each of the test cells was disassembled upon termination of cathodic polarization at the 100th cycle, and was found to have no deposits of metallic lithium.

Table 8 also lists the discharge capacity at the second cycle per g of active material and discharge capacity retention ratio at the 100th cycle in each cell. These results indicated higher discharge capacity retention ratio of the batteries embodied in Example 8 in response to charge and discharge cycles.

TABLE 8

| Active materials | Conductive materials | Discharge capacity (mAh/g) | Capacity retention ratio (%) |
|---|---|---|---|
| $SnF_4$ | natural graphite | 450 | 100 |
| | artifical graphite | 450 | 100 |
| | poorly crystalline carbon | 450 | 100 |
| | carbon black | 550 | 100 |
| | acetylene black | 550 | 100 |
| | ketchen black | 550 | 100 |
| | carbon fiber | 500 | 100 |
| | copper powder | 450 | 100 |
| | nickel powder | 450 | 100 |
| | aluminum powder | 500 | 100 |
| | silver powder | 550 | 100 |
| | metallic nickel fiber | 500 | 100 |
| | polyphenylen derivatives | 500 | 100 |
| $SnBr_4$ | natural graphite | 450 | 100 |
| | artifical graphite | 450 | 100 |
| | poorly crystalline carbon | 450 | 100 |
| | carbon black | 550 | 100 |
| $SnBr_4$ | acetylene black | 550 | 100 |
| | ketchen black | 550 | 100 |
| | carbon fiber | 500 | 100 |
| | copper powder | 450 | 100 |
| | nickel powder | 450 | 100 |
| | aluminum powder | 500 | 100 |
| | silver powder | 550 | 100 |
| | metallic nickel fiber | 500 | 100 |
| | polyphenylen derivatives | 500 | 100 |
| $SnI_4$ | natural graphite | 450 | 100 |
| | artifical graphite | 450 | 100 |
| | poorly crystalline carbon | 450 | 100 |
| | carbon black | 550 | 100 |
| | acetylene black | 550 | 100 |
| | ketchen black | 550 | 100 |
| | carbon fiber | 500 | 100 |
| | copper powder | 450 | 100 |
| | nickel powder | 450 | 100 |
| | aluminum powder | 500 | 100 |
| | silver powder | 550 | 100 |
| | metallic nickel fiber | 500 | 100 |
| | polyphenylen derivatives | 500 | 100 |

TABLE 8-continued

| Active materials | Conductive materials | Discharge capacity (mAh/g) | Capacity retention ratio (%) |
|---|---|---|---|
| | aluminum powder | 500 | 100 |
| | silver powder | 550 | 100 |
| | metallic nickel fiber | 500 | 100 |
| | polyphenylen derivatives | 500 | 100 |

EXAMPLE 9

In this example, various lithium composite compounds were prepared by intercalating a predetermined amount of lithium in $SnF_4$, $SnBr_4$ and $SnCl_4$ and evaluated for their characteristics as electrodes.

First, electrodes including either active material lithium composite compound were produced and assembled into test cells similar to those used in Example 1.

The above lithium composite compounds were quantitated for their lithium content by ICP spectrophotometry and their composition was identified. The results are shown in Table 9.

TABLE 9

| Lithium composite compounds | Discharge capacity (mAh/g) | Capacity retention ratio (%) |
|---|---|---|
| $SnF_4$ | 600 | 90 |
| $Li_{0.1}SnF_4$ | 600 | 90 |
| $Li_{0.5}SnF_4$ | 600 | 90 |
| $LiSnF_4$ | 600 | 95 |
| $Li_2SnF_4$ | 600 | 95 |
| $Li_3SnF_4$ | 620 | 90 |
| $Li_4SnF_4$ | 650 | 95 |
| $Li_5SnF_4$ | 650 | 90 |
| $Li_6SnF_4$ | 670 | 95 |
| $Li_7SnF_4$ | 680 | 95 |
| $Li_8SnF_4$ | 670 | 90 |
| $Li_9SnF_4$ | 640 | 90 |
| $Li_{10}SnF_4$ | 600 | 90 |
| $Li_{11}SnF_4$ | 600 | 23 |
| $Li_{12}SnF_4$ | 600 | 15 |
| $SnBr_4$ | 600 | 90 |
| $Li_{0.1}SnBr_4$ | 600 | 90 |
| $Li_{0.5}SnBr_4$ | 620 | 85 |
| $LiSnBr_4$ | 650 | 95 |
| $Li_2SnBr_4$ | 600 | 90 |
| $Li_3SnBr_4$ | 600 | 90 |
| $Li_4SnBr_4$ | 630 | 90 |
| $Li_5SnBr_4$ | 650 | 85 |
| $Li_6SnBr_4$ | 670 | 85 |
| $Li_7SnBr_4$ | 680 | 85 |
| $Li_8SnBr_4$ | 670 | 85 |
| $Li_9SnBr_4$ | 640 | 85 |
| $Li_{10}SnBr_4$ | 580 | 75 |
| $Li_{11}SnBr_4$ | 600 | 30 |
| $Li_{12}SnBr_4$ | 600 | 10 |
| $SnCl_4$ | 600 | 90 |
| $Li_{0.1}SnCl_4$ | 600 | 90 |
| $Li_{0.5}SnCl_4$ | 600 | 90 |
| $LiSnCl_4$ | 600 | 90 |
| $Li_2SnCl_4$ | 600 | 90 |
| $Li_3SnCl_4$ | 600 | 90 |
| $Li_4SnCl_4$ | 600 | 95 |
| $Li_5SnCl_4$ | 600 | 90 |
| $Li_6SnCl_4$ | 600 | 95 |
| $Li_7SnCl_4$ | 640 | 95 |
| $Li_8SnCl_4$ | 620 | 90 |
| $Li_9SnCl_4$ | 600 | 85 |

TABLE 9-continued

| Lithium composite compounds | Discharge capacity (mAh/g) | Capacity retention ratio (%) |
|---|---|---|
| $Li_{10}SnCl_4$ | 550 | 85 |
| $Li_{11}SnCl_4$ | 550 | 23 |
| $Li_{12}SnCl_4$ | 550 | 15 |

It was found that in the composite compound intercalated with lithium represented by the general formula $Li_\kappa SnX_\alpha$, where X represents at least one of bromine and iodine and where $1<\alpha<12$, when the value of $\kappa$ which represents lithium content is in a range of $0 \leq \kappa < 10$, that compound can exhibit good electrode characteristics. In other words, when the value of $\kappa$ is within the above range, the compound does not suffer from deposition of metallic lithium. As a result, the battery including such compound manifests satisfactory reversible charge and discharge characteristics, high discharge capacity retention ratio and a long cycle life. When $10 \leq \kappa$, all the batteries including such compounds were confirmed to exhibit impaired cycle life characteristics. This may be interpreted as follows: compounds intercalated excess lithium ($10 \leq \kappa$) are liable to produce inactive lithium, which may impair the cycle life characteristics of the resultant batteries.

In this example, although the compounds $SnF_4$, $SnBr_4$ and $SnCl_4$ with a predetermined amount of lithium were used as the negative electrode active materials, the use of any compound represented by the general formula $Li_\kappa MX_\alpha$ where X represents at least one selected from the group consisting of fluorine, chlorine, bromine and iodine and M represents at least one selected from the group consisting of Si, Ge, Pb, Bi, P, B, Ga, In, Al, As, Sb, Zn, Ir, Mg, Ca, Sr and Ba, and where $0 \leq \kappa < 10$ and $1 < \alpha < 12$ as the negative electrode active material can produce identical effects.

EXAMPLE 10

In this example, $SnF_4$, $SnBr_4$ and $SnCl_4$ which are representative negative electrode active materials in accordance with the present invention were compared for their characteristics as electrode when they had a crystalline structure or an amorphous structure.

First, electrodes including either active material were produced and assembled into test cells similar to those used in Example 1.

The results of comparison are shown in Table 10.

TABLE 10

| Active materials | Discharge capacity (mAh/g) | Capacity retention ratio (%) |
|---|---|---|
| amorphous $SnF_4$ | 600 | 90 |
| crystalline $SnF_4$ | 400 | 30 |
| amorphous $SnBr_4$ | 600 | 90 |
| crystalline $SnBr_4$ | 300 | 20 |
| amorphous $SnCl_4$ | 600 | 90 |
| crystalline $SnCl_4$ | 300 | 20 |

All the batteries including the amorphous negative electrode active materials had a high capacity and exhibited superb cycle life characteristics. On the other hand, those including the crystalline negative electrode active materials had a small capacity and was greatly impaired in their cycle life characteristics. The superior characteristics in the batteries including the amorphous active materials to those of the batteries including the crystalline active materials may reflect better retention of reversible charge and discharge against the progress of charge and discharge cycles.

EXAMPLE 11

In this example, a close analysis was made on the difference in electrode characteristics by the mean size of primary particle in $SnF_4$, $SnBr_4$ and $SnCl_4$ which are representative negative electrode active materials in accordance with the present invention.

Those active materials were compared for their electrode characteristics when their primary particle had mean sizes in a range of 0.005 μm to 5 μm.

First, electrodes including either active material were produced and assembled into test cells similar to those used in Example 1 for evaluation of the characteristics of the active materials.

The results are shown in Table 11.

TABLE 11

| | Mean size of primary particle (μm) | Discharge capacity (mAh/g) | Capacity retention ratio (%) |
|---|---|---|---|
| $SnF_4$ | 0.005 | 600 | 90 |
| | 0.01 | 600 | 90 |
| | 0.05 | 600 | 90 |
| | 0.1 | 600 | 95 |
| | 0.5 | 650 | 95 |
| | 1.0 | 680 | 95 |
| | 2.0 | 670 | 90 |
| | 5.0 | 640 | 90 |
| $SnBr_4$ | 0.005 | 600 | 90 |
| | 0.01 | 600 | 90 |
| | 0.05 | 600 | 90 |
| | 0.1 | 600 | 95 |
| | 0.5 | 650 | 95 |
| | 1.0 | 680 | 95 |
| | 2.0 | 670 | 90 |
| | 5.0 | 640 | 90 |
| $SnCl_4$ | 0.005 | 600 | 90 |
| | 0.01 | 600 | 90 |
| | 0.05 | 600 | 90 |
| | 0.1 | 600 | 95 |
| | 0.5 | 650 | 95 |
| | 1.0 | 680 | 95 |
| | 2.0 | 670 | 90 |
| | 5.0 | 640 | 90 |

The electrodes constituted by the negative electrode active materials whose primary particle had a mean size in a range of 0.01 μm to 1 μm were found to offer better electrode characteristics. In other words, those electrodes had no deposits of metallic lithium on their alloy surface, contributing to the fair reversible charge and discharge, large discharge capacity and high discharge capacity retention ratio against cycles of the resultant batteries.

The reason of low capacity and impaired cycle life characteristics in the batteries including active materials whose primary particle size had a mean size below 0.01 μm or less is estimated as follows: such active materials are an aggregation of very fine primary particles, which make it difficult for the active materials to ensure current collection. Conversely, when the primary particle had a mean size larger than 1 μm, the resultant electrode meets difficulty in coping with changes in volume or the like due to charge and discharge reaction (lithium intercalation and deintercalation). As a result, batteries having such electrodes exhibited only a low capacity and a great reduction in cycle life.

Here, it should be noticed that the conductive materials for constituting the negative active material mixtures in accordance with the present invention are not limited to those as exemplified in the foregoing examples, and any electronic conductive material which does not have any adverse effect on battery performance may be used similarly. For example, materials whose carbon is partially replaced by other element such as B, P, N, S, H or F may also be applicable, in addition to carbon materials such as graphite and low crystalline carbon.

Any carbide containing a metal or a semi-metal may also be usable. Examples of applicable carbides are $Al_4C_3$, $Al_2C_6$, $Na_2C_2$, $K_2C_2$, $Cu_2C_2$, $Ag_2C_2$, $MgC_2$, $Mg_2C_3$, $CaC_2$, $ZnC_2$, $VC_2$, SiC, $B_{12}C_3$, $Cr_3C_2$, $Cr_7C_3$, $Cr_4C$, TiC, VC, $V_4C_3$, $V_5C$, MOC, $Mo_2C$, WC, $W_2C$, $Mn_3C$, $Mn_{23}C_6$, $Mn_7C_3$, $Fe_3C$, $Fe_2C$, FeC, $Co_3C$, $Co_2C$, $CoC_2$ and $Ni_3C$.

The above-noted conductive materials can be used singly or in combination as appropriate according to the required battery performance.

In the foregoing examples, although the positive electrode active material was $LiMn_{1.8}Co_{0.2}O_4$, lithium-manganese composite oxides such as $LiMn_2O_4$, manganese dioxide, lithium-nickel composite oxides such as $LiNiO_2$, lithium-cobalt composite oxides such as $LiCoO_2$, lithium containing oxides of transition metal such as lithium containing cobalt-nickel composite oxide, lithium containing cobalt-manganese composite oxide, lithium containing vanadium oxide and the like, and transition metal chalcogenides such as titanium disulfide, molybdenum disulfide and the like can similarly produce positive electrodes which stand reversible against charge and discharge loads. Among them, particularly preferred ones are lithium containing transition metal oxides.

Examples of applicable binder to the positive electrode are polyacrylic acid, carboxymethyl cellulose, polytetrafluoroethylene, polyvinylidene fluoride, polyvinylidene fluoride-hexafluoropropylene copolymer, polyvinyl alcohol, starch, diacetyl cellulose, hydroxypropyl cellulose, polyvinyl chloride, polyvinyl pyrrolidone, polyethylene, polypropylene, butadiene-stylene rubber (SBR), EPDM, sulfonated EPDM, fluorocarbon rubber, polybutadiene, polyethylene oxide, and preferable ones are polyvinylidene fluoride, polyvinylidene fluoride-hexafluoropropylene copolymer, polytetrafluoroethylene, polyacrylic acid, carboxymethyl cellulose and SBR. The same are similarly applicable to the negative electrode.

Applicable current collectors to the positive electrode are aluminum, stainless steel, nickel, titanium and alloys of these metals. Desired shapes for those current collectors are foil, expanded metal, perforated metal or mesh. Particularly useful current collector is an aluminum foil.

Examples of applicable current collectors for constituting the negative electrode are copper, stainless steel, nickel, titanium and alloys of these metals. Desired shapes are foil, expanded metal, perforated metal or mesh. A copper foil is particularly useful.

Applicable solvents for constituting the non-aqueous electrolyte may be exemplified as propylene carbonate, ethylene carbonate, butylene carbonate, dimethyl carbonate, diethyl carbonate, ethyl methyl carbonate, 1,2-dimethoxyethane, γ-butylolactone, tetrahydrofuran, 2-methyltetrahydrofuran, dimethylsulfoxide, dioxolane, 1,3-dioxolane, formamide, dimethylformamide, nitromethane, acetonitrile, methyl formate, methyl acetate, methyl propionate, triethyl phosphate, trimethoxymethane, dioxolane derivatives, sulfolane, 3-methyl-2-oxasolidinone, propylene carbonate derivatives, tetrahydro derivatives, diethyl ether, and 1,3-propanesultone, and mixtures of two or more of them. Particularly preferred solvents are mixtures containing at least one or both of ethylene carbonate and propylene carbonate.

As the solute for constituting the electrolyte, lithium containing salts, sodium containing salts, magnesium containing salts, aluminum containing salts, potassium containing salts, rubidium containing salts and calcium containing salts may be usable. Of them, lithium containing salts are preferable; $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, low fatty acid group lithium carboxylate, $LiAlCl_4$, LiCl, LiBr, LiI, lithium chloroborate, and lithium tetraphenyl borate are particularly effective.

As shown above, the non-aqueous electrolyte secondary battery in accordance with the present invention has a high discharge capacity and a drastically elongated cycle life as a result of freedom from the growth of adverse lithium dendrites during charge and discharge operations.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising:
    a rechargeable positive electrode,
    a rechargeable negative electrode, and
    a non-aqueous electrolyte,
    wherein said negative electrode includes a compound represented by the general formula $Li_\kappa MX_\alpha$, where X represents at least one element selected from the group consisting of fluorine, chlorine, bromine and iodine and M represents at least one element selected from the group consisting of Sn, Pb, Bi, B, In, Ir, Mg, Ca, Sr, and Ba and where $0 \leq \kappa < 10$ and $2 < \alpha < 12$.

2. The non-aqueous electrolyte secondary battery in accordance with claim 1, wherein the value of α in said general formula is in a range of $4 < \alpha < 8$.

3. A non-aqueous electrolyte secondary battery comprising:
    a rechargeable positive electrode,
    a rechargeable negative electrode, and
    a non-aqueous electrolyte,
    wherein said negative electrode includes a compound represented by the general formula $Li_\kappa SnF_\alpha$, where $0 \leq \kappa < 10$ and $2 < \alpha < 12$.

4. The non-aqueous electrolyte secondary battery in accordance with claim 3, wherein said negative electrode further comprises a conductive material and a binder.

5. The non-aqueous electrolyte secondary battery in accordance with claim 3, wherein the compound represented by said general formula is amorphous.

6. The non-aqueous electrolyte secondary battery in accordance with claim 3, wherein primary particles of said compound represented by said general formula have a mean size of 0.01 μm to 1 μm.

7. The non-aqueous electrolyte secondary battery in accordance with claim 3, wherein the value of α in said general formula is in a range of $4<\alpha<8$.

8. A non-aqueous electrolyte secondary battery comprising:

a rechargeable positive electrode,
   a rechargeable negative electrode, and
   a non-aqueous electrolyte,
   wherein said negative electrode includes a compound represented by the general formula $Li_\kappa MX_\alpha$, where X represents at least one element selected from the group consisting of fluorine, chlorine, bromine and iodine and M represents at least one element selected from the group consisting of Sn, Pb, Bi, B, In, Ir, Mg, Ca, Sr, and Ba and where $0 \leq \kappa < 10$ and $1 < \alpha \leq 2$.

9. A non-aqueous electrolyte secondary battery comprising:

a rechargeable positive electrode,
   a rechargeable negative electrode, and
   a non-aqueous electrolyte,
   wherein said negative electrode includes a compound represented by the general formula $Li_\kappa SnF_\alpha$, where $0 \leq \kappa < 10$ and $1 < \alpha \leq 2$.

* * * * *